United States Patent
Arman et al.

(10) Patent No.: US 7,024,867 B2
(45) Date of Patent: Apr. 11, 2006

(54) METHOD FOR OPERATING A CRYOCOOLER USING ON LINE CONTAMINANT MONITORING

(75) Inventors: Bayram Arman, Grand Island, NY (US); James J. Volk, Clarence, NY (US); Steve A. Richards, Somerset, NJ (US); M. Mushtaq Ahmed, Pittsford, NY (US); Arun Acharya, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 132 days.

(21) Appl. No.: 10/847,342

(22) Filed: May 18, 2004

(65) Prior Publication Data

US 2005/0257534 A1    Nov. 24, 2005

(51) Int. Cl.
*F25D 9/00*    (2006.01)
(52) U.S. Cl. .................. 62/6; 62/474; 62/129
(58) Field of Classification Search ........... 62/6, 62/474, 475, 129
See application file for complete search history.

(56) References Cited

U.S. PATENT DOCUMENTS

| | | | | |
|---|---|---|---|---|
| 3,793,846 A | * | 2/1974 | Dehne | 62/6 |
| 4,417,451 A | * | 11/1983 | Spauschus | 62/129 |
| 4,872,316 A | * | 10/1989 | Browne et al. | 62/129 |
| 5,113,663 A | | 5/1992 | Gifford | 62/6 |
| 5,398,512 A | | 3/1995 | Inaguchi et al. | 62/6 |
| 5,806,328 A | * | 9/1998 | Muston et al. | 62/149 |
| 6,354,087 B1 | * | 3/2002 | Nakahara et al. | 62/6 |
| 6,374,617 B1 | | 4/2002 | Bonaquist et al. | 62/6 |
| 6,378,312 B1 | | 4/2002 | Wang | 62/6 |
| 6,604,363 B1 | | 8/2003 | Corey et al. | 62/6 |
| 6,640,553 B1 | | 11/2003 | Kotsubo et al. | 62/6 |
| 6,644,038 B1 | | 11/2003 | Acharya et al. | 62/6 |

OTHER PUBLICATIONS

Ackermann et al., "Advanced Cryocooler Cooling for MRI Systems", Cryocoolers 10 (1999) pp 857-867.
Castlers et al., "Space Cryocooler Contamination Lessons Learned and Recommended Control Procedures", Cryocoolers 11 (2001) pp 649-657.
Ackermann et al., "Cryogenic Refrigerator Evaluation for Medical and Rotating Machine Applications", Cryocoolers 12 (2003) pp 805-811.

* cited by examiner

*Primary Examiner*—William C. Doerrler
(74) *Attorney, Agent, or Firm*—Stanley Ktorides

(57) ABSTRACT

A method for operating a cryocooler which provides opportunity for timely intervention prior to failure thus enhancing the reliability of the provision of the refrigeration wherein contaminant concentration downstream of a compressor but upstream of the cryocooler is monitored and the time rate of change of the contaminant concentration is used to calculate a service time.

6 Claims, 4 Drawing Sheets

$$\Delta t_{service} \alpha \frac{m_{TotalAllowed}}{\left\langle \frac{dm}{dt} \right\rangle_{initial}}$$

METHOD FOR OPERATING A CRYOCOOLER USING ON LINE CONTAMINANT MONITORING

TECHNICAL FIELD

This invention relates generally to low temperature or cryogenic refrigeration and, more particularly, to the operation of a cryocooler.

BACKGROUND ART

Cryocoolers are employed to generate refrigeration and to provide that refrigeration for applications such as high temperature superconductivity and magnetic resonance imaging. Failure of the cryocooler can have severe consequences for such application systems. It is desirable therefore to operate a cryocooler so as to avoid the failure of the cryocooler while it is on line.

Accordingly, it is an object of this invention to provide a method for operating a cryocooler so as to reduce or eliminate the likelihood of the cryocooler failing while it is on line and providing critical refrigeration to an application such as a magnetic resonance imaging system or a high temperature superconductivity application.

SUMMARY OF THE INVENTION

The above and other objects, which will become apparent to those skilled in the art upon a reading of this disclosure, are attained by the present invention which is:

A method for operating a cryocooler comprising:

(A) compressing a working gas using a compressor and passing the working gas to a cryocooler having a regenerator in flow communication with a thermal buffer tube;

(B) monitoring the contaminant concentration of the working gas between the compressor and the regenerator of the cryocooler to determine the time rate of change of the contaminant concentration of the working gas;

(C) employing the determined time rate of change of the contaminant concentration of the working gas to calculate a service time; and (D) servicing the cryocooler if the calculated service time is less than a predetermined value.

As used herein the term "contaminant" means one or more of a carbon dioxide, carbon monoxide, hydrogen, nitrogen, oxygen, argon, hydrocarbon(s), and moisture.

As used herein the term "service time" means the time remaining before the build up of contaminant(s) within a cryocooler degrades the operation of the cryocooler so that the refrigeration being generated by the cryocooler is below a predetermined minimum.

As used herein the term "regenerator" means a thermal device in the form of porous distributed mass or media, such as spheres, stacked screens, perforated metal sheets and the like, with good thermal capacity to cool incoming warm gas and warm returning cold gas via direct heat transfer with the porous distributed mass.

As used herein the term "thermal buffer tube" means a cryocooler component separate from the regenerator and proximate the cold heat exchanger and spanning a temperature range from the coldest to the warmer heat rejection temperature for that stage.

As used herein the term "indirect heat exchange" means the bringing of fluids into heat exchange relation without any physical contact or intermixing of the fluids with each other.

As used herein the term "direct heat exchange" means the transfer of refrigeration through contact of cooling and heating entities.

As used herein the term "frequency modulation valve" means a valve or system of valves generating oscillating pressure and mass flow at a desired frequency.

DETAILED DESCRIPTION

In general the invention is a method for operating a cryocooler using on line monitoring of the contamination of the working gas downstream of the pressure wave generator but upstream of the regenerator as a diagnostic tool to provide advance warning of a cryocooler system failure or degradation which facilitates timely intervention to service the cryocooler before the operation of the application receiving the refrigeration from the cryocooler is compromised.

Figure 1:
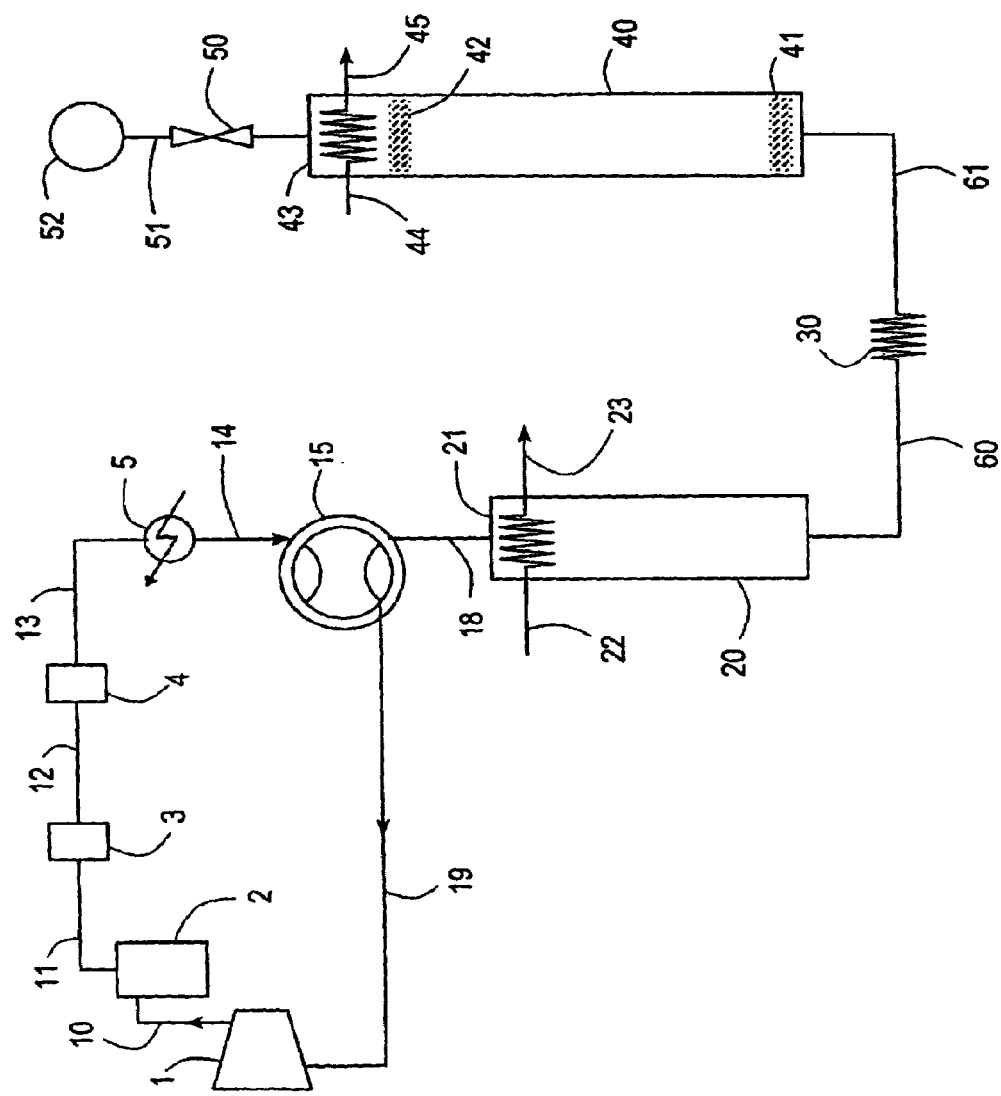
FIG. 1 is a schematic representation of one preferred embodiment of a cryocooler system which may be employed in the practice of this invention.

The FIG. 1 illustrates one preferred embodiment of a cryocooler which will benefit from the practice of this invention. Referring now to the Figure, cryocooler working gas, such as helium, neon, argon, and mixtures thereof, with helium being preferred, is compressed in compressor 1 which may be oil lubricated. The compressed working gas, if from an oil lubricated compressor, is passed in line 10 to coalescing filter or filters 2 which is part of the oil removal train which also includes adsorptive separator 3 and ultrafine filter 4. The compressed working gas passes from coalescing filter 2 to adsorptive separator 3 in line 11, and from adsorptive separator 3 to ultrafine filter 4 in line 12.

Coalescing filter 2 removes oil droplets and mist, and adsorptive separator bed 3 removes oil vapor. Ultrafine filter 4 removes any remaining micro particulates and extra fine oil mist. At the end of the oil removal train, the oil related impurity or contamination level of the working gas in line 13 is less than 1 ppbv. Typical bed materials for the adsorptive bed 3 could be a zeolite, activated carbon and alumina. Heat of compression from the working gas is removed in an aftercooler 5 which may be located anywhere between the frequency modulation valve 15 and compressor discharge line 11. Frequency modulation valve 15 connects clean discharge 14 or suction 19 of the compressor with line 18 to produce necessary oscillations to drive the coldhead. The valve is driven by a motorized system (not shown). The operating frequency of the cryocooler may be up to the range of from 50 to 60 hertz, although it is typically less than 30 hertz, preferably less than 10 hertz, and most preferably less than 5 hertz.

The pulsing working gas applies a pulse to the hot end of regenerator 20 thereby generating an oscillating working gas and initiating the first part of the pulse tube sequence. The compressed hot working gas is cooled, preferably by indirect heat exchange with heat transfer fluid 22 in heat exchanger 21, to produce warmed heat transfer fluid in stream 23 and to cool the compressed working gas of the heat of compression. Examples of fluids useful as the heat transfer fluid 22, 23 in the practice of this invention include water, air, ethylene glycol and the like.

Regenerator 20 contains regenerator or heat transfer media. Examples of suitable heat transfer media in the practice of this invention include steel balls, wire mesh, high density honeycomb structures, expanded metals, lead balls, copper and its alloys, complexes of rare earth element(s) and transition metals. The pulsing or oscillating working gas is cooled in regenerator 20 by direct heat exchange with cold regenerator media to produce cold pulse tube working gas.

Thermal buffer tube 40 and regenerator 20 are in flow communication. The flow communication includes cold heat exchanger 30. The cold working gas passes in line 60 to cold heat exchanger 30 and in line 61 from cold heat exchanger 30 to the cold end of thermal buffer tube 40. Within cold heat exchanger 30 the cold working gas is warmed by indirect heat exchange with a refrigeration load thereby providing refrigeration to the refrigeration load. This heat exchange with the refrigeration load is not illustrated. One example of a refrigeration load is for use in a magnetic resonance imaging system. Another example of a refrigeration load is for use in high temperature superconductivity.

The working gas is passed from the regenerator 20 to thermal buffer tube 40 at the cold end. Preferably, as illustrated in the Figure thermal buffer tube 40 has a flow straightener 41 at its cold end and a flow straightener 42 at its hot end. As the working gas passes into thermal buffer tube 40 it compresses gas in the thermal buffer tube and forces some of the gas through heat exchanger 43 and orifice 50 in line 51 into reservoir 52. Flow stops when pressures in both the thermal buffer tube and the reservoir are equalized. The thermal buffer tube may have a mechanical displacer to facilitate heat pumping from the cold to the warm heat exchanger such as in Gifford-McMahon and Stirling cryocoolers.

Cooling fluid 44 is passed to heat exchanger 43 wherein it is warmed or vaporized by indirect heat exchange with the working gas, thus serving as a heat sink to cool the compressed working gas. Resulting warmed or vaporized cooling fluid is withdrawn from heat exchanger 43 in stream 45. Preferably cooling fluid 44 is water, air, ethylene glycol or the like.

In the low pressure point of the pulsing sequence, the working gas within the thermal buffer tube expands and thus cools, and the flow is reversed from the now relatively higher pressure reservoir 52 into the thermal buffer tube 40. The cold working gas is pushed into the cold heat exchanger 30 and back towards the warm end of the regenerator while providing refrigeration at heat exchanger 30 and cooling the regenerator heat transfer media for the next pulsing sequence. Orifice 50 and reservoir 52 are employed to maintain the pressure and flow waves in appropriate phase so that the thermal buffer tube generates net refrigeration during the compression and the expansion cycles in the cold end of thermal buffer tube 40. Other means for maintaining the pressure and flow waves in phase which may be used in the practice of this invention include inertance tube and orifice, expander, linear alternator, bellows arrangements, and a work recovery line connected back to the compressor with a mass flux suppressor. In the expansion sequence, the working gas expands to produce working gas at the cold end of the thermal buffer tube 40. The expanded gas reverses its direction such that it flows from the thermal buffer tube toward regenerator 20. The relatively higher pressure gas in the reservoir flows through valve 50 to the warm end of the thermal buffer tube 40. In summary, thermal buffer tube 40 rejects the remainder of pressure-volume work generated by the compression and frequency modulation system as heat into warm heat exchanger 43.

The expanded working gas emerging from heat exchanger 30 is passed in line 60 to regenerator 20 wherein it directly contacts the heat transfer media within the regenerator to produce the aforesaid cold heat transfer media, thereby completing the second part of the cryocooler refrigeration sequence and putting the regenerator into condition for the first part of a subsequent cryocooler refrigeration sequence. Pulsing gas from regenerator 20 passes back to valve 15 and in suction conduit 19 to compressor 1.

The performance of the cryocooler may degrade with time due to contamination of the working gas and the freezing of contaminants within the cryocooler. The monitoring of contaminant concentration within the cryocooler is not of value because contaminants will freeze out of the working gas within the cryocooler. This invention encompasses the recognition that valuable contaminant concentration monitoring occurs upstream of the regenerator of the cryocooler, and moreover, the time rate of change of the contaminant concentration, not merely the contaminant concentration, enables one to accurately determine a service time to ensure timely intervention and servicing of the cryocooler prior to failure of the cryocooler to provide the minimum refrigeration necessary for the application.

The contaminant concentration is monitored after the final filter, i.e. downstream of filter 4 in the system illustrated in the Figure, but upstream of the regenerator. The contaminant concentration monitoring may be between filter 4 and frequency modulation valve 15, or may be between frequency modulation valve 15 and regenerator 20. All contaminants could be monitored using an appropriate gas chromatograph or infrared detector. Results from a calibrated gas chromatograph, for example, will provide quantitative contamination levels. Infrared sensing and catalytic sensing techniques could be used for determining hydrocarbon and hydrogen levels. Oxygen levels could be measured by electrolytic methods. Infrared sensing techniques could also be used for carbon dioxide and moisture measurements. Moisture can also be measured by capacitive transducer and electrochemical techniques.

The invention utilizes contaminant level trending as a diagnostic tool. Available refrigeration from the cryocooler system degrades with time. The rate of degradation could be different depending on the causes in play. Cryocoolers are expected to have contaminants in (a) vapor form, (b) liquid droplets and (c) particulate form. Particulate counter devices could measure the particulate and liquid droplet levels within the working fluid. Vapor species such as air atmospheric gases, hydrogen and hydrocarbons are measured using devices that utilize various techniques such as electrochemical, gas chromatograph, infrared, etc. For most of the techniques the tested specimen is lost from the operating gas such that the measurements must be in an intermittent manner.

Figure 2:
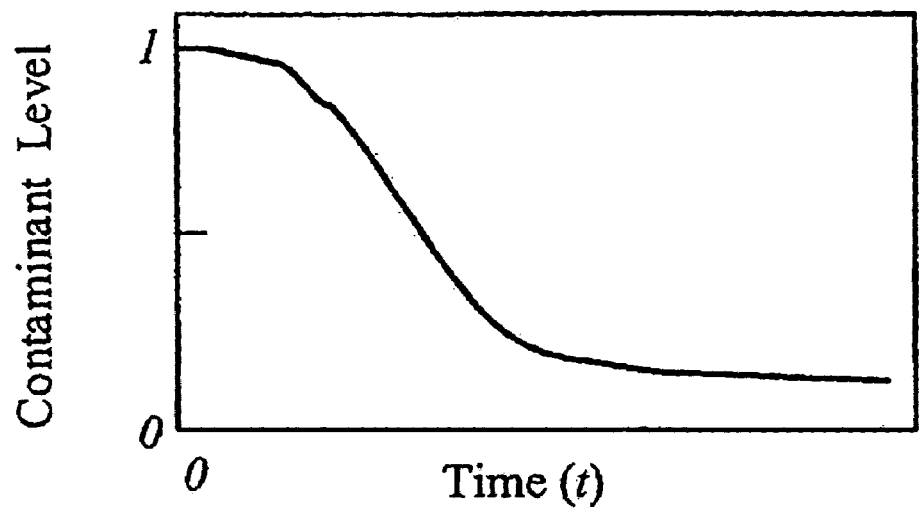
FIGS. 2–6 are graphs showing changes in contaminant and temperature levels over time.

If there is no new contaminant entering into the cryocooler the contaminant level within the working fluid at the warm end will decrease from its initial level due to freezing of some of the contaminants which is pictorially depicted below in FIG. 2—this could be named as baseline contaminant graph. Any increase in the contaminant level at any given time from this trend would negatively impact the cryocooler's useful life and performance. If for example, the contaminant level is noticeably higher for a newly charged cryocooler one may evacuate and recharge the cryocooler. If the initial contamination levels are comparable with the baseline case, then no action is required.

Let us suppose that the cryocooler under its design load will operate at a temperature $T_c$ and the maximum temperature that could be tolerated for the operation of a superconducting system is $T_h$; thus one can define the cryocooler operating window is between $T_c$ and $T_h$.

Figure 3:
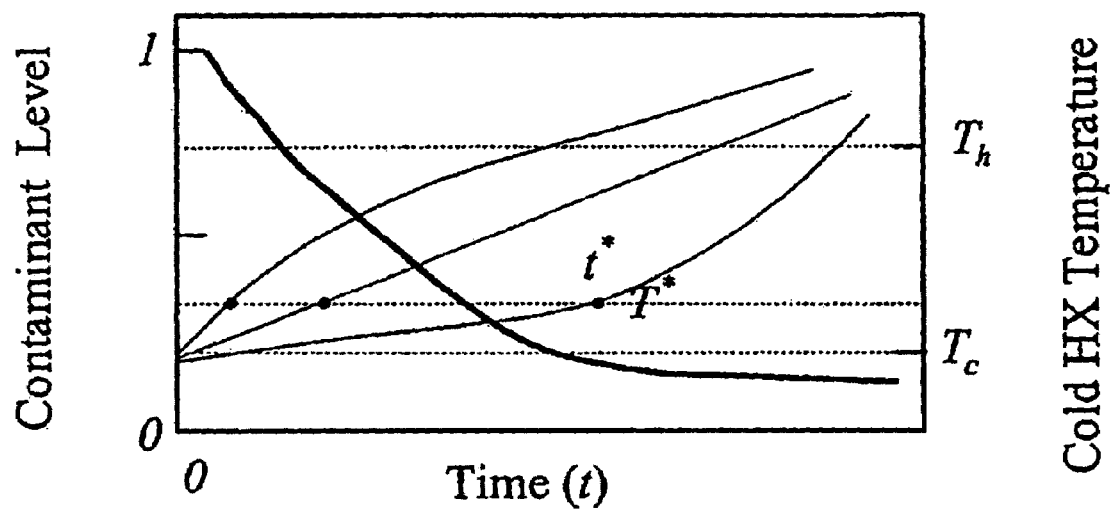

In a cryocooler as the contaminant level is decreasing within the working fluid, i.e. existing contaminants freezing as shown in FIG. 3, the cryocooler temperature will tend to increase. A correlation may be developed between the contaminant level and temperature to predict service time, $\Delta t_{service}$, in the following manner. When temperature of the cold heat exchanger increases about some percentage of the allowable temperature window (e.g. 20%), then three possible contamination level trends will exists.

At $t=t^*T^*=T_c+0.20^*(T_h-T_c)$

Case I: $\dfrac{dC}{dt}=0$

Case II: $\dfrac{dC}{dt}<0$

Case III: $\dfrac{dC}{dt}>0$

For case I, almost all the contaminants are already frozen and thus this cryocooler is expected to perform for an indefinite amount of time. For case II, contaminants are still being frozen thus it is expected that the cryocooler performance would further deteriorate. For case III, there is new contamination being introduced to the cryocooler, and the cryocooler should be serviced quickly.

One of the main problems with the current cryocoolers driven by oil-flooded compressors is the failure of the oil separation system. If oil as in particulate or hydrocarbon vapor form passes the oil separation system, then the contaminant level increases or stays in a high level as shown below in FIG. 4. If a contaminant broke through the system and is still being introduced the contaminant level graph may show the following trends where additional contaminant is introduced into the system at time t1 and either the level continues to increase or levels off at a higher asymptote. If this were the case then one would expect the cryocooler should fail at some time. The rate of the contaminant accumulation within the coldhead could be inferred using the initial rate of increase of the contaminant at time $t_1$ $$\text{Initial rate of increase} = \left(\dfrac{dm}{dt}\right)_{initial}$$

Figure 4:
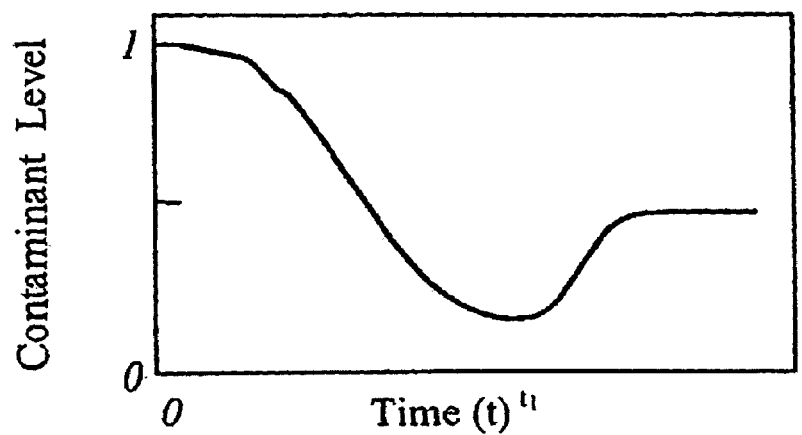
Figure 4:
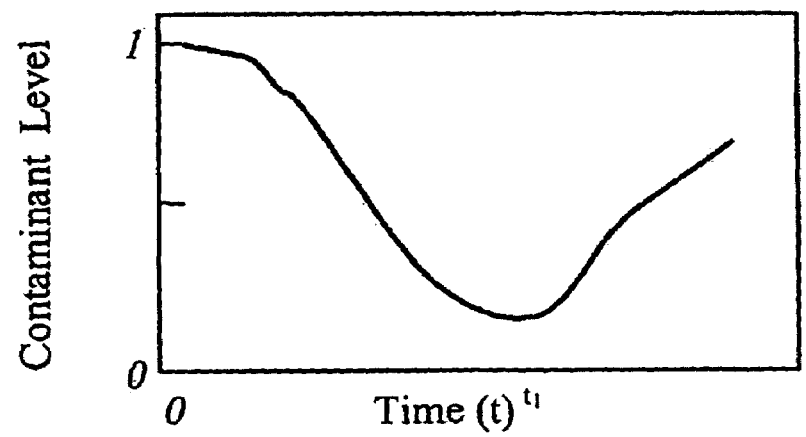

Using historical data from cryocoolers in service, a correlation of the following form show in FIG. 4 could be developed:

$$\Delta t_{service} \alpha \dfrac{m_{TotalAllowed}}{\left(\dfrac{dm}{dt}\right)_{initial}}$$

Figure 5:
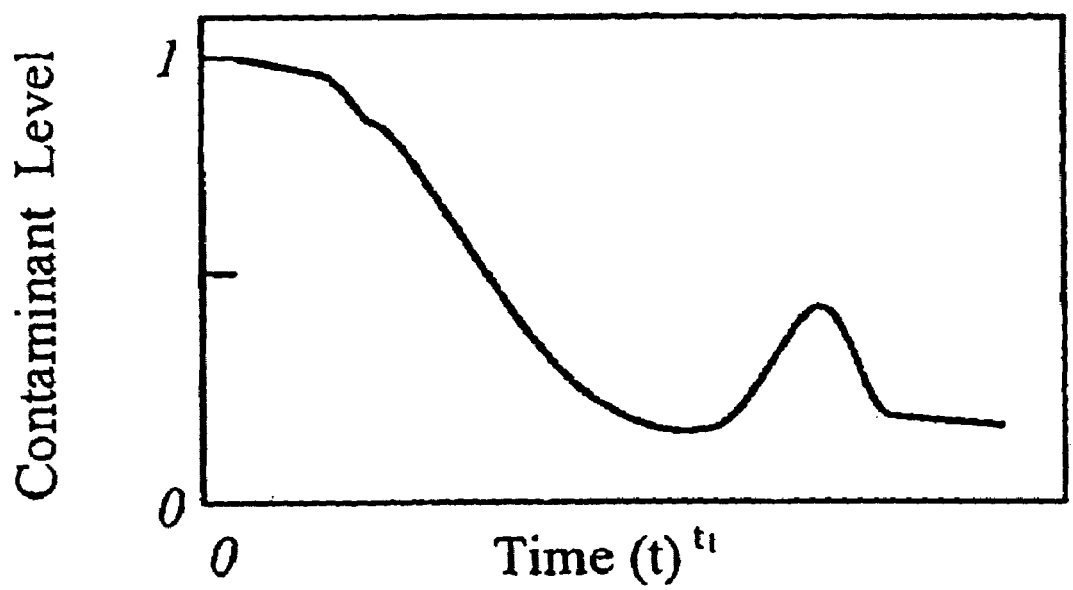

If a contaminant broke through at once and it is not being introduced continuously then the contaminant level graph may show the trend shown in FIG. 5 of an increase from its baseline at time t1 and subsequent decrease to a lower asymptote. In this case no action is required.

Figure 6:
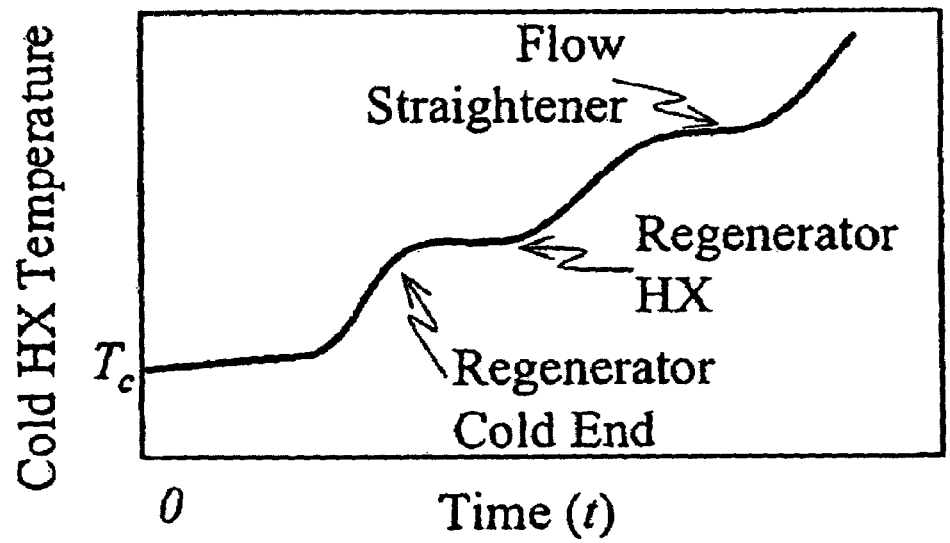

The contaminant level in the working fluid can be used as a diagnostic tool in conjunction with the refrigeration temperature. The contaminant accumulation will adversely affect this temperature as shown in FIG. 6 which shows the effect of the contaminant migration from the regenerator into the cold heat exchanger and finally into the flow straightener at the cold end of the thermal buffer tube of the cryocooler. The rate of the time averaged temperature change will be different for different locations and amounts of freezing contaminants.

Although the invention has been described in detail with reference to certain preferred embodiments, those skilled in the art will recognize that there are other embodiments of the invention within the spirit and the scope of the claims.

The invention claimed is:

1. A method for operating a cryocooler comprising:
   (A) compressing a working gas using a compressor and passing the working gas to a cryocooler having a regenerator in flow communication with a thermal buffer tube;
   (B) monitoring the contaminant concentration of the working gas between the compressor and the regenerator of the cryocooler to determine the time rate of change of the contaminant concentration of the working gas;
   (C) employing the determined time rate of change of the contaminant concentration of the working gas to calculate a service time; and
   (D) servicing the cryocooler if the calculated service time is less than a predetermined value.

2. The method of claim 1 wherein the working gas passes through a frequency modulation valve between the compressor and the regenerator, and the monitoring of the contaminant concentration takes place between the compressor and the frequency modulation valve.

3. The method of claim 1 wherein the working gas passes through a frequency modulation valve between the compressor and the regenerator, and the monitoring of the contaminant concentration takes place between frequency modulation valve and the regenerator.

4. The method of claim 1 wherein the working gas passes through a filter between the compressor and the regenerator, and the monitoring of the contaminant concentration takes place between the filter and the regenerator.

5. The method of claim 1 wherein the working gas passes through a filter and a frequency modulation valve between the compressor and the regenerator, and the monitoring of the contaminant concentration takes place between the filter and the frequency modulation valve.

6. The method of claim 1 wherein the working gas passes through a plurality of filters between the compressor and the regenerator, and the monitoring of the contaminant concentration takes place after the plurality of filters.

* * * * *